US012112130B2

(12) United States Patent
Nangi et al.

(10) Patent No.: US 12,112,130 B2
(45) Date of Patent: Oct. 8, 2024

(54) COUNTERFACTUAL TEXT STYLIZATION

(71) Applicant: Adobe Inc., San Jose, CA (US)

(72) Inventors: Sharmila Reddy Nangi, Hyderabad (IN); Niyati Himanshu Chhaya, Hyderabad (IN); Hyman Chung, San Ramon, CA (US); Harshit Nyati, Kota (IN); Nikhil Kaushik, Panchkula (IN); Sopan Khosla, Pittsburgh, PA (US)

(73) Assignee: Adobe Inc., San Jose, CA (US)

(*) Notice: Subject to any disclaimer, the term of this patent is extended or adjusted under 35 U.S.C. 154(b) by 393 days.

(21) Appl. No.: 17/518,471

(22) Filed: Nov. 3, 2021

(65) Prior Publication Data

US 2023/0137209 A1 May 4, 2023

(51) Int. Cl.
| | |
|---|---|
| *G06F 40/253* | (2020.01) |
| *G06F 3/04847* | (2022.01) |
| *G06F 40/151* | (2020.01) |
| *G06F 40/166* | (2020.01) |
| *G06F 40/30* | (2020.01) |

(52) U.S. Cl.
CPC ........ *G06F 40/253* (2020.01); *G06F 3/04847* (2013.01); *G06F 40/151* (2020.01); *G06F 40/166* (2020.01); *G06F 40/30* (2020.01)

(58) Field of Classification Search
CPC .. G06F 40/253; G06F 3/04847; G06F 40/151; G06F 40/166; G06F 40/30; G06F 40/16; G06F 40/216; G06F 40/44; G06F 40/56
See application file for complete search history.

(56) References Cited

U.S. PATENT DOCUMENTS

| | | | | |
|---|---|---|---|---|
| 5,111,398 A | * | 5/1992 | Nunberg ............... | G06F 40/253 704/9 |
| 9,442,923 B1 | * | 9/2016 | Abou Mahmoud .. | G06F 40/106 |

(Continued)

OTHER PUBLICATIONS

Wu, T., Ribeiro, M. T., Heer, J., & Weld, D. S. (2021). Polyjuice: Generating counterfactuals for explaining, evaluating, and improving models. arXiv preprint arXiv:2101.00288. (Year: 2021).*

(Continued)

*Primary Examiner* — Douglas Godbold
*Assistant Examiner* — Philip H Lam
(74) *Attorney, Agent, or Firm* — FIG. 1 Patents

(57) ABSTRACT

A text style transfer system is described that generates different stylized versions of input text by rewriting the input text according to a target style. To do so, the text style transfer system employs a variational autoencoder to derive separate content and style representations for the input text, where the content representation specifies semantic information conveyed by the input text and the style representation specifies one or more style attributes expressed by the input text. The style representation using counterfactual reasoning to identify different transfer strengths for applying the target style to the input text. Each transfer strength represents a minimum change to the input text that achieves a different expression of the target style. The transfer strengths are then used to generate style representation variants, which are each concatenated with the content representation of the input text to generate the plurality of different stylized versions of the input text.

20 Claims, 7 Drawing Sheets

(56) References Cited

U.S. PATENT DOCUMENTS

| | | | | |
|---|---|---|---|---|
| 2012/0022852 | A1* | 1/2012 | Tregaskis | G06F 40/47 |
| | | | | 704/E11.001 |
| 2020/0193661 | A1* | 6/2020 | Kaneko | G06N 3/08 |
| 2020/0311195 | A1* | 10/2020 | Mishra | G06F 40/253 |
| 2020/0372225 | A1* | 11/2020 | Xu | G06N 3/08 |
| 2021/0110118 | A1* | 4/2021 | Jain | G06N 3/08 |
| 2021/0174784 | A1* | 6/2021 | Min | G06N 3/08 |
| 2021/0264109 | A1* | 8/2021 | Srinivasan | G06F 40/166 |
| 2022/0245322 | A1* | 8/2022 | Lundin | G06T 11/60 |

OTHER PUBLICATIONS

Pope, Q., & Fern, X. Z. (2021). Text Counterfactuals via Latent Optimization and Shapley-Guided Search. arXiv preprint arXiv:2110.11589. (Year: 2021).*

Qin, L., Bosselut, A., Holtzman, A., Bhagavatula, C., Clark, E., & Choi, Y. (2019). Counterfactual story reasoning and generation. arXiv preprint arXiv:1909.04076. (Year: 2019).*

John, V., Mou, L., Bahuleyan, H., & Vechtomova, O. (2018). Disentangled representation learning for non-parallel text style transfer. arXiv preprint arXiv:1808.04339. (Year: 2018).*

Prabhumoye, S., Tsvetkov, Y., Salakhutdinov, R., & Black, A. W. (2018). Style transfer through back-translation. arXiv preprint arXiv:1804.09000. (Year: 2018).*

Hossain, A. S., Akter, N., & Islam, M. S. (Jan. 2020). A stylometric approach for author attribution system using neural network and machine learning classifiers. In Proceedings of the International Conference on Computing Advancements (pp. 1-7). (Year: 2020).*

Sudhakar, A., Upadhyay, B., & Maheswaran, A. (2019). Transforming delete, retrieve, generate approach for controlled text style transfer. arXiv preprint arXiv:1908.09368. (Year: 2019).*

Aaker, Jennifer L., "Dimensions of Brand Personality", Journal of Marketing Research, vol. 34 No. 3 [retrieved Aug. 16, 2021]. Retrieved from the Internet <http://185.7.248.139/MPBS_2019/lezioni/Lesson_1/Dimensions_of_BP_1997_Aaker.pdf>., Aug. 1, 1997, 10 Pages.

Arjovsky, Martin et al., "Towards Principled Methods for Training Generative Adversarial Networks", International Conference on Learning Representations [retrieved Aug. 16, 2021]. Retrieved from the Internet <http://modelai.gettysburg.edu/2020/wgan/Resources/Lesson3/PrincipledMethodsGANs.pdf>., Nov. 4, 2016, 17 Pages.

Bottou, Léon et al., "Counterfactual reasoning and learning systems: the example of computational advertising", The Journal of Machine Learning Research vol. 14, No. 1 <https://www.microsoft.com/en-us/research/wp-content/uploads/2012/09/1209.2355v1.pdf>., Nov. 2013, 56 Pages.

Bowman, Samuel R. et al., "Generating Sentences from a Continuous Space", SIGNLL Conference on Computational Natural Language Learning (CONLL), 2016 [retrieved Aug. 16, 2021]. Retrieved from the Internet <https://arxiv.org/pdf/1511.06349.pdf?utm_source=top.caibaojian.com/54109>., May 12, 2016, 12 pages.

Cho, Kyunghyun et al., "Learning Phrase Representations using RNN Encoder-Decoder for Statistical Machine Translation", In EMNLP, 2014 [retrieved Aug. 16, 2021]. Retrieved from the Internet <https://emnlp2014.org/papers/pdf/EMNLP2014179.pdf>., Sep. 3, 2014, 14 Pages.

Fu, Zhenxin et al., "Style Transfer in Text: Exploration and Evaluation", Thirty-Second AAAI Conference on Artificial Intelligence, vol. 32 No. 1 [retrieved Aug. 13, 2021]. Retrieved from the Internet <http://www.ruiyan.me/pubs/AAAI2018Fu.pdf>., Nov. 27, 2017, 9 pages.

Ghosh, Sayan et al., "Affect-LM: A Neural Language Model for Customizable Affective Text Generation", Proceedings of the 55th Annual Meeting of the Association for Computational Linguistics, vol. 1 [retrieved aug. 13, 2021]. Retrieved from the Internet <http://multicomp.cs.cmu.edu/wp-content/uploads/2017/10/2017_ACL_Ghosh_Affect.pdf>., Jul. 2017, 9 Pages.

Jin, Zhijing et al., "IMaT: Unsupervised Text Attribute Transfer via Iterative Matching and Translation", In: EMNLP-IJCNLP 2019 [retrieved Aug. 16, 2021]. Retrieved from the Internet <https://aclanthology.org/D19-1306.pdf>., Nov. 2019, 13 Pages.

John, Vineet et al., "Disentangled Representation Learning for Non-Parallel Text Style Transfer", Proceedings of the 57th Annual Meeting of the Association for Computational Linguistics [retrieved Aug. 13, 2021]. Retrieved from the Internet <https://aclanthology.org/P19-1041.pdf>., Jul. 2018, 11 Pages.

Joulin, Armand et al., "Bag of Tricks for Efficient Text Classification", Proceedings of the 15th Conference of the European Chapter of the Association for Computational Linguistics vol. 2 [retrieved Aug. 16, 2021]. Retrieved from the Internet <https://aclanthology.org/E17-2068.pdf>., Aug. 9, 2016, 5 pages.

Kneser, Reinhard et al., "Improved backing-off for M-gram language modeling", 1995 International Conference on Acoustics, Speech, and Signal Processing vol. 1 [retrieved Aug. 16, 2021]. Retrieved from the internet <http://www-i6.informatik.rwth-aachen.de/publications/download/951/Kneser-ICASSP-1995.pdf>., May 9, 1995, 4 pages.

Laugel, Thibault et al., "Comparison-Based Inverse Classification for Interpretability in Machine Learning", 17th International Conference on Information Processing and Management of Uncertainty in Knowledge-Based Systems [retrieved Aug. 16, 2021]. Retrieved from the Internet <https://hal.sorbonne-universite.fr/hal-01905982/file/180115_final.pdf>., May 18, 2018, 13 Pages.

Li, Juncen et al., "Delete, Retrieve, Generate: A Simple Approach to Sentiment and Style Transfer", Proceedings of the 2018 Conference of the North American Chapter of the Association for Computational Linguistics: Human Language Technologies, vol. 1 [retrieved Aug. 13, 2021] Retrieved from the Internet <https://aclanthology.org/N18-1169.pdf>., Apr. 17, 2018, 12 pages.

Li, Weizhi et al., "Regularization via Structural Label Smoothing", Twenty Third International Conference on Artificial Intelligence and Statistics [retrieved Aug. 16, 2021]. Retrieved from the Internet <http://proceedings.mlr.press/v108/li20e/li20e.pdf>., Jan. 7, 2020, 10 Pages.

Liu, Dayiheng et al., "Revision in Continuous Space: Unsupervised Text Style Transfer without Adversarial Learning", AAAI Technical Track: Natural Language Processing, vol. 34 No. 5 [retrieved Aug. 16, 2021]. Retrieved from the Internet <https://arxiv.org/pdf/1905.12304.pdf>., Apr. 3, 2020, 14 Pages.

Martens, David et al., "Explaining Data-Driven Document Classifications", MIS Quarterly vol. 38, No. 1 [retrieved Aug. 16, 2021]. Retrieved from the Internet <https://fosterprovost.com/wp-content/uploads/2019/07/Explaining-Data-Driven-Document-Classifications.pdf>., Mar. 2014, 28 Pages.

Mikolov, Tomas et al., "Distributed Representations of Words and Phrases and their Compositionality", NIPS'13: Proceedings of the 26th International Conference on Neural Information Processing Systems vol. 2 [retrieved Sep. 17, 2021]. Retrieved from the Internet <https://proceedings.neurips.cc/paper/2013/file/9aa42b31882ec039965f3c4923ce901b-Paper.pdf>., Oct. 2013, 9 pages.

Molnar, Christoph, "Interpretable Machine Learning", Leanpub, British Columbia, Canada [retrieved Aug. 16, 2021]. Retrieved from the Internet <https://christophm.github.io/interpretable-ml-book/>., Feb. 21, 2019, 251 Pages.

Neal, Lawrence et al., "Open Set Learning with Counterfactual Images", The European Conference on Computer Vision (ECCV) [retrieved Aug. 16, 2021]. Retrieved from the Internet <http://web.engr.oregonstate.edu/~olsomatt/open_set_counterfactual.pdf>., Nov. 20, 2018, 16 Page.

Papineni, Kishore et al., "BLEU: a Method for Automatic Evaluation of Machine Translation", Proceedings of the 40th Annual Meeting of the Association for Computational Linguistics (ACL) [retrieved Aug. 16, 2021]. Retrieved from the Internet <https://aclanthology.org/P02-1040.pdf>., Jul. 2002, 8 Pages.

Prabhumoye, Shrimai et al., "Style Transfer Through Back-Translation", In Proceedings of the 56th Annual Meeting of the Association for Computational Linguistics, vol. 1 [retrieved Aug. 13, 2021]. Retrieved from the Internet <http://www.cs.cmu.edu/~awb/papers/P18-1080.pdf>., Jul. 2018, 11 Pages.

Rao, Sudha, "Are You Asking the Right Questions? Teaching Machines to Ask Clarification Questions", Proceedings of ACL

(56) References Cited

OTHER PUBLICATIONS

2017, Student Research Workshop [retrieved Aug. 16, 2021]. Retrieved from the Internet <https://aclanthology.org/P17-3006.pdf>., Jan. 2017, 6 Pages.

Rao, Sudha et al., "Dear Sir or Madam, May I Introduce the GYAFC Dataset: Corpus, Benchmarks and Metrics for Formality Style Transfer", Proceedings of the 2018 Conference of the North American Chapter of the Association for Computational Linguistics: Human Language Technologies, vol. 1 [retrieved Aug. 16, 2021]. Retrieved from the Internet <https://aclanthology.org/N18-1012.pdf>., Apr. 16, 2018, 12 pages.

Reddy, Sravana et al., "Obfuscating Gender in Social Media Writing", Proceedings of the First Workshop on NLP and Computational Social Science [retrieved Aug. 16, 2021]. Retrieved from the Internet <https://aclanthology.org/W16-5603.pdf>., Nov. 2016, 10 Pages.

Shen, Tianxiao et al., "Style Transfer from Non-Parallel Text by Cross-Alignment", NIPS'17: Proceedings of the 31st International Conference on Neural Information Processing Systems [retrieved Aug. 13, 2021]. Retrieved from the Internet <https://proceedings.neurips.cc/paper/2017/file/2d2c8394e31101a261abf1784302bf75-Paper.pdf>., Nov. 6, 2017, 12 pages.

Sudhakar, Akhilesh et al., ""Transforming" Delete, Retrieve, Generate Approach for Controlled Text Style Transfer", Proceedings of the 2019 Conference on Empirical Methods in Natural Language Processing [retrieved Aug. 13, 2021]. Retrieved from the Internet <https://aclanthology.org/D19-1322.pdf>., Nov. 2019, 11 Pages.

Vaswani, Ashish et al., "Attention Is All You Need", Cornell University arXiv Preprint, arXiv.org [retrieved Sep. 17, 2021]. Retrieved from the Internet <https://arxiv.org/pdf/1706.03762.pdf>., Dec. 6, 2017, 15 pages.

Voigt, Rob et al., "RtGender: A Corpus for Studying Differential Responses to Gender", Proceedings of the Eleventh International Conference on Language Resources and Evaluation [retrieved Aug. 16, 2021]. Retrieved from the Internet <https://aclanthology.org/L18-1445.pdf>., May 2018, 7 Pages.

Wachter, Sandra et al., "Counterfactual Explanations without Opening the Black Box: Automated Decisions and the GDPR", Harvard Journal of Law & Technology, vol. 31 No. 2 [retrieved Aug. 16, 2021]. Retrieved from the Internet <https://www.ilsa.org/ILW/2018/CLE/Panel%20%2348%20-%20Wachter%20et%20al.-Automated%20Decisions%20and%20the%20GDPR.pdf>., Nov. 2, 2017, 36 Pages.

Wang, Ke et al., "Controllable Unsupervised Text Attribute Transfer via Editing Entangled Latent Representation", Advances in Neural Information Processing Systems 32 [retrieved Aug. 13, 2021]. Retrieved from the Internet <https://proceedings.neurips.cc/paper/2019/file/8804f94e16ba5b680e239a554a08f7d2-Paper.pdf>., May 2019, 11 Pages.

\* cited by examiner

COUNTERFACTUAL TEXT STYLIZATION

BACKGROUND

In textual communications, words, syntax, punctuation, and the like significantly affect how a reader interprets an author's message. For instance, by using different punctuation without changing words or syntax, an author can convey starkly different emotions (e.g., "sure!" vs. "sure . . . "). Style aspects of text such as sentiment, formality, tone, excitement, and so forth are important considerations for an author when conveying a message to a particular audience, as a style for communicating with close friends is often inappropriate for professional communications. For entities that require substantial amounts of text to be authored in varying styles for different audiences, it becomes increasingly difficult to ensure that text is appropriately styled for a particular audience, and a success is entirely dependent on an individual author's ability to understand and replicate the appropriate style for the particular audience.

Conventional approaches rely on experienced copywriters to manually author messages that convey the same message content in different styles for different target audiences. However, this manual styling is intractable for diverse audiences. Some conventional approaches attempt to provide automated generation of stylized text. However, these conventional automated approaches provide only a coarse control over style applied to text and do not allow for fine-grained control of style changes. Consequently, conventional approaches are unable to scale to generate stylized text for diverse audiences and remain susceptible to human error.

SUMMARY

A text style transfer system is described that generates a plurality of different stylized versions of input text by rewriting the input text according to a target style. Examples of a target style used for generating the stylized versions of the input text include a positive sentiment, a negative sentiment, formal, informal, excited, indifferent, and so forth. To do so, the text style transfer system receives input text and employs a variational autoencoder to derive separate content and style representations for the input text, where the content representation specifies semantic information conveyed by the input text and the style representation specifies one or more style attributes expressed by the input text. To ensure that the style and content representations remain disentangled from one another, the text style transfer system guides output of the variational autoencoder using variational autoencoder loss and a combination of multitask and adversarial losses for each of style and content latent space representations.

The style representation generated by the variational autoencoder is then processed by a multi-layer perceptron classifier trained using counterfactual generation loss to identify different transfer strengths for applying the target style to the input text. By virtue of using counterfactual reasoning, each of the different transfer strengths represents a minimum change to the input text that achieves a different expression of the target style. The transfer strengths are then used to generate style representation variants, which in turn are each concatenated with the content representation of the input text to generate the plurality of different stylized versions of the input text. The text style transfer system is configured to output controls that enable specification of specific transfer strengths to be used for applying various target style attributes when rewriting the input text.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the description.

DETAILED DESCRIPTION

Overview

Figure 1:
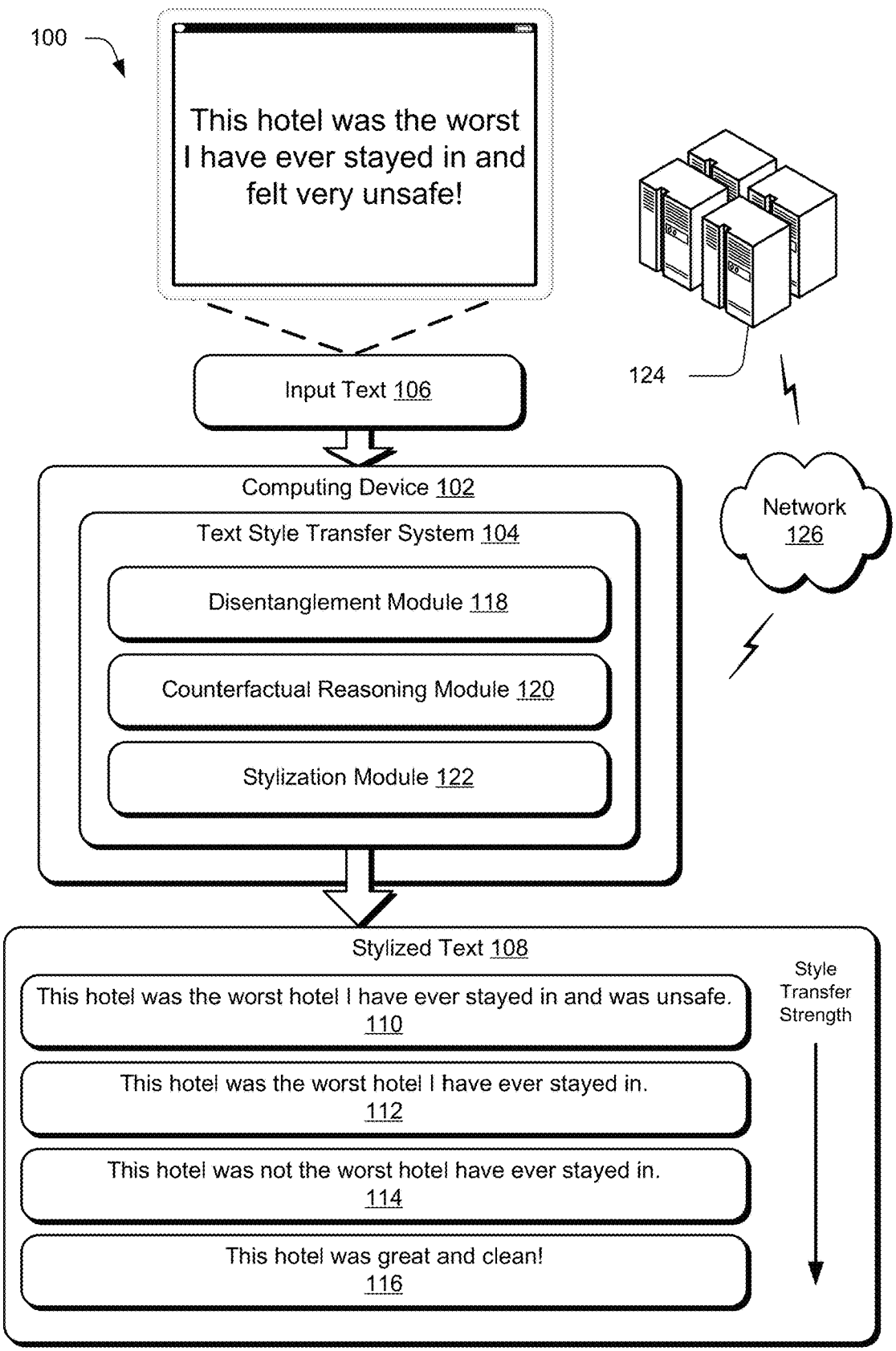
FIG. 1 is an illustration of a digital medium environment in an example implementation that is operable to employ a text style transfer system to generate stylized versions of input text using counterfactual reasoning.

Textually conveying information in an appropriate fashion becomes increasingly difficult when conveying the information to diverse audiences, as a style (e.g., tone, formality, sentiment, etc.) expressed by the text may be appropriate for one audience and inappropriate for another audience. When scaled, the sheer number of audience considerations makes manually drafting different variations of textual information intractable. In an effort to automate the creation of text variants that target specific audience considerations (e.g., formal tone for textual workplace communications), conventional approaches provide automated tools for generating text variants.

However, these conventional approaches provide tools that support only a single-shot transfer of limited text constructs (e.g., individual sentences) by changing individual words to express a different overall style. These conventional approaches are further limited by often requiring labeled datasets, such as annotations that call out specific style attributes of input text (e.g., information specifying certain words that evoke excitement, certain words that express formality, and so forth) or parallel corpuses of text that convey similar information using different styles (e.g., a first sentence conveying information formally and a second sentence conveying the information informally).

These labeled datasets are then used to train a language model under supervised learning, with the objective of the language model identifying aspects of a writing style. However, these conventional approaches are limited in scope to styles for which parallel, labeled datasets are available, and are unable to scale to accommodate variations in style not explicitly expressed by the labeled datasets. As an alternative to these supervised learning approaches, some conventional language modeling approaches define linguistic rules for a designated style and attempt to generate text under constraints specified by the linguistic rules. However, these linguistic rule-based approaches are intractable given the large number of rules required to capture a text style, and are limited in their performance by the level of detail included in the linguistic rules, which are often manually generated (e.g., via user inputs to define the rules). Thus, conventional approaches to text rewriting are unable to provide control over a degree in which a target style attribute is applied to input text when rewriting the input text.

Accordingly, a system and techniques for generating different stylized versions of input text are described herein. A text style transfer system receives input text and an indication of a target style to be used for rewriting the input text. Examples of a target style used for generating the stylized versions of the input text include sentiment (e.g., positive to negative sentiments), formality (e.g., formal to informal expressions), excitement (e.g., excited to indifferent expressions), gender tone of voice (e.g., feminine to masculine tone), and so forth. To preserve semantic information conveyed by the input text, the text style transfer system employs a variational autoencoder that generates separate style and content representations for the input text in a latent space.

To ensure that the style and content representations are disentangled from one another, such that the style representation does not include content information and the content representation does not include style information, the variational autoencoder is guided using a combination of losses. This combination of losses includes a variational autoencoder loss, a multitask style loss, an adversarial style loss, a multitask content loss, and an adversarial content loss. The resulting content representation thus expresses in latent space semantic information conveyed by the input text while the style representation describes style attributes expressed by the input text in the same latent space. In some implementations, the variational autoencoder is configured using a transformer-based architecture, which ensures strong content preservation and disentanglement from style, consequently enabling strong control over strengths at which a target style is applied to the input text.

The text style transfer system then processes the style representation generated by the variational autoencoder with a multi-layer perceptron classifier trained using counterfactual generation loss to identify different transfer strengths useable for applying the target style to the input text. By virtue of using counterfactual reasoning, each of the different transfer strengths represents a minimum change to the input text that achieves a different expression of the target style. In this manner, the transfer strengths identified by the text style transfer system are useable to provide fine-grained control of generating text variants for specific target style attributes. The transfer strengths are used to apply the target style to the style representation, which results in the generation of different style representation variants for the input text. The style representation variants are then each concatenated with the content representation of the input text to generate a plurality of different stylized versions of the input text.

In this manner, given an indication of a target style (e.g., formality), the text style transfer system is configured to identify a plurality of transfer strengths that each specify a magnitude of the target style relative to a direction (e.g., a magnitude relative to a formal expression or informal expression). From the plurality of formality transfer strengths, the text style transfer system generates a plurality of stylized versions of input text, where each of the stylized versions expresses a different degree of formality while preserving semantic information conveyed by the input text. The text style transfer system is configured to output controls that enable specification of transfer strengths to be used for applying various target style attributes when rewriting the input text.

Thus, the system and techniques described herein provide fine-grained control over generation of text variants for one or more target style attributes. Further discussion of these and other examples is included in the following sections and shown in corresponding figures.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles, etc.) to low-resource devices with limited memory and/or processing resources (e.g., mobile devices). Additionally, although a single computing device 102 is shown, the computing device 102 is representative of a plurality of different devices, such as multiple servers utilized to perform operations "over the cloud."

The computing device 102 is illustrated as including a text style transfer system 104. The text style transfer system 104 is representative of functionality of the computing device 102 to receive an input text 106 and rewrite the input text 106 to generate stylized text 108 that includes a plurality of variants of the input text 106, modified according to one or more target style attributes. For example, in the illustrated example of FIG. 1, the input text 106 represents the sentence "This hotel was the worst I have ever stayed in and felt very unsafe!" The stylized text 108 includes the input text 106 rewritten by applying varying strengths of a "positive sentiment" target attribute to achieve stylized versions 110, 112, 114, and 116 of the input text 106.

Contrasted with the input text 106, the stylized version 110 represents a result generated by applying a first strength of the positive sentiment target attribute when modifying the input text 106 and recites "This hotel was the worst hotel I have ever stayed in and was unsafe." The stylized version 112 represents a result generated by applying a second strength of the positive sentiment target attribute, which is greater than the first strength used to achieve the stylized version 110, and recites "This hotel was the worst hotel I have ever stayed in." The stylized version 114 represents a result generated by applying a third strength of the positive sentiment attribute, which in turn is greater than the second strength used to achieve the stylized version 112, and recites "This hotel was not the worst hotel I have ever stayed in." Finally, the stylized version 116 represents a result generated by applying a fourth strength of the positive sentiment attribute, which is greater than the third strength used to generate the stylized version 114, and recites "This hotel was great and clean!"

In implementations, differences between each of the first, second, third, and fourth strengths by which the positive sentiment attribute is applied to the input text 106 to achieve the stylized versions 110, 112, 114, and 116 are approximately uniform. In this manner, the text style transfer system 104 is configured to provide precise control in applying target style attributes to input text 106, thus enabling controlled style transfer rather than a one-shot attempt at binary style changes (e.g., a simple negative sentiment to positive sentiment change). Although illustrated as including four variations of the input text 106, the text style transfer system 104 is configured to generate the stylized text 108 to include any number of variations of the input text 106 using the techniques described herein.

To generate the stylized text 108, the text style transfer system 104 employs a disentanglement module 118, a counterfactual reasoning module 120, and a stylization module 122. The disentanglement module 118, the counterfactual reasoning module 120, and the stylization module 122 are each implemented at least partially in hardware of the computing device 102 (e.g., through use of a processing system and computer-readable storage media), as described in further detail below with respect to FIG. 6.

The disentanglement module 118 is configured to process the input text 106 and derive a content representation and a style representation for the input text 106. As described herein, the content representation of the input text 106 includes information describing the semantic meaning of the input text 106. In contrast, the style representation of the input text 106 includes information describing stylistic attributes of the input text 106, such as formality, sentiment, tone, excitement level, political inclination, author gender, and so forth. To derive the content and style representations for the input text 106, the disentanglement module 118 is configured to implement a variational autoencoder model trained to identify style representations for various stylistic attributes, such as the positive sentiment attribute used to generate the stylized versions 110, 112, 114, and 116 represented in FIG. 1.

In some implementations, the variational autoencoder implemented by the disentanglement module 118 is configured as a Recurrent Neural Network (RNN)-based variational autoencoder. Alternatively, in some implementations the variational autoencoder is configured using a transformer-based architecture. To ensure that the latent space in which both the content and style of the input text 106 is represented remains disentangled, the disentanglement module 118 leverages both multitask and adversarial losses for generating each of the style and content representations.

The counterfactual reasoning module 120 is configured to determine style transfer strengths that are useable to derive variants of the style representation for the input text 106. The style transfer strengths are determined in a manner that ensures the resulting variants remain close to the style representation of the input text 106 in the latent space containing the style and content representations. Additionally, the style transfer strengths are computed so that different style transfer strengths create variants of the style representation with minimum differences relative to one another while ensuring that the variants do not convey the same target style attribute.

For instance, consider an example scenario where the counterfactual reasoning module 120 computes style transfer strengths for an "informal" target style attribute, such that not applying a style transfer (e.g., a transfer strength of zero) maintains a current formality of the input text 106 and a maximum style transfer strength generates a most informal variant of the input text 106. In this example scenario, the counterfactual reasoning module 120 is configured to derive the greatest number of style transfer strengths between zero and the maximum transfer strength. As a limit, the counterfactual reasoning module 120 ensures that no two transfer strengths create identical variants of the input text 106 or variants that convey a same degree of formality.

To compute the style transfer strengths for a target style attribute, the counterfactual reasoning module 120 leverages a multi-layer perceptron (MLP) classifier trained on disentangled style representations generated by the disentanglement module 118 for a given target style. The MLP classifier is trained using a counterfactual generation loss, which ensures that the style transfer strengths output by the counterfactual reasoning module 120 generate variants of the input text 106 that each convey a different degree of a target style attribute while minimizing distances between the style transfer strengths.

The stylization module 122 is configured to generate the stylized text 108 by generating variants of the style representation of the input text 106 using the style transfer strengths generated by the counterfactual reasoning module 120. The stylization module 122 then combines variants of the style representation with the content representation generated by the disentanglement module 118 to generate stylized versions of the input text 106 (e.g., the stylized versions 110, 112, 114, and 116). In this manner, the text style transfer system 104 ensures that a semantic meaning of the input text 106 is preserved while generating the stylized text 108. In some implementations, the stylization module 122 outputs each stylized version of the stylized text 108 together with an indication of the target style attribute used to generated the stylized version and a corresponding style transfer strength with which the target style attribute was applied.

The stylized text 108, the input text 106, and other information processed or generated by the text style transfer system 104 are configured to be stored in storage of the computing device 102, as described in further detail below with respect to FIG. 6. Alternatively or additionally, the text style transfer system 104 is configured to provide the input text 106, the stylized text 108, and additional information described in further detail below with respect to FIGS. 2-5 to a remote storage location for subsequent retrieval and/or access by the computing device 102 or different computing devices. For instance, the text style transfer system 104 communicates information to remote storage 124, or directly to a different computing device, via network 126.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are configured to be applied together and/or combined in different ways. Thus, individual functionality, features, and concepts described in relation to different example environments, devices, components, figures, and procedures herein are useable in any suitable combinations and are not limited to the combinations represented by the enumerated examples in this description.

Having considered an example digital medium environment, consider now a discussion of an example system useable to generate stylized text in the writing style of a target author in accordance with aspects of the disclosure herein.

Figure 2:
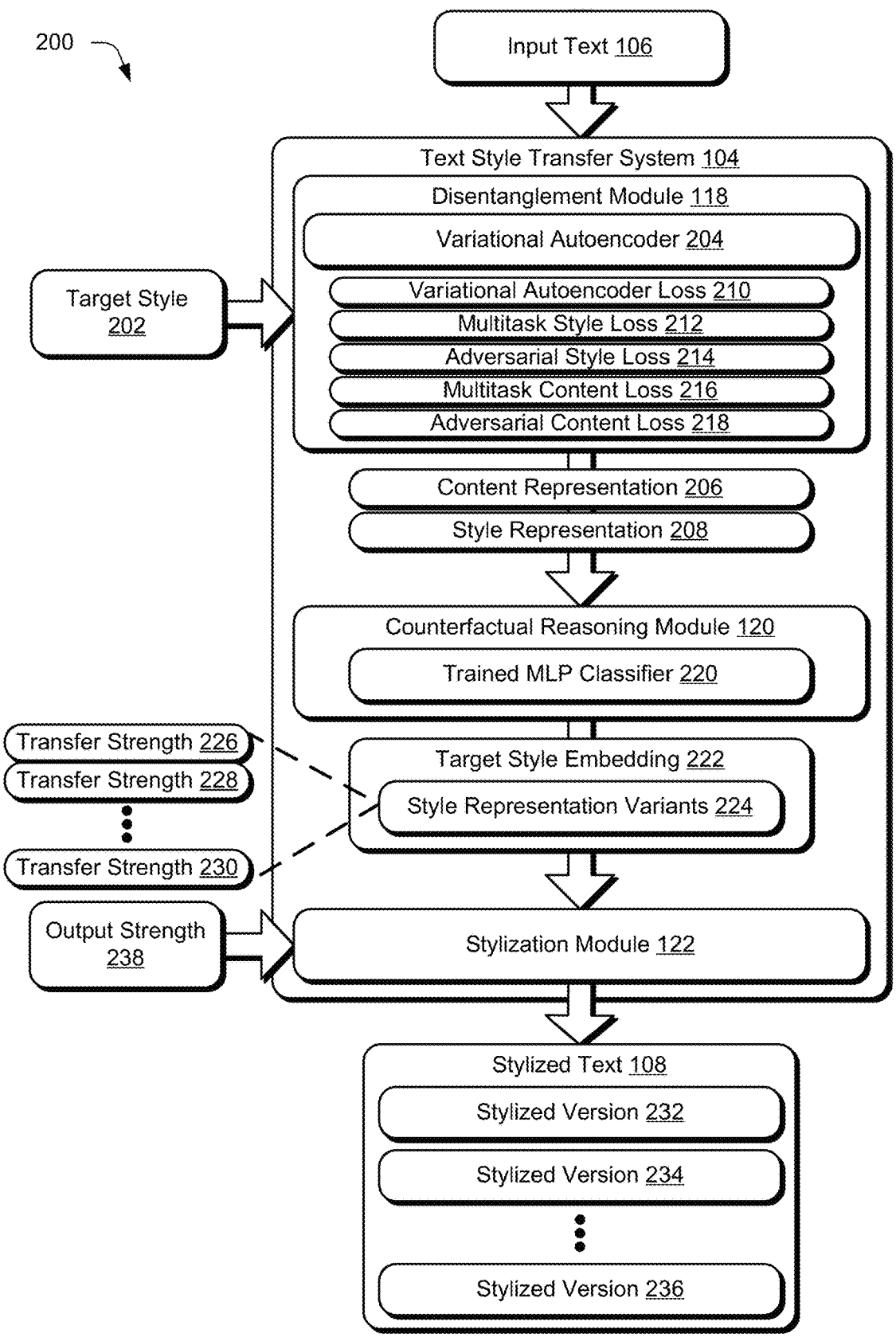
FIG. 2 depicts a digital medium environment showing operation of the text style transfer system of FIG. 1 in greater detail.

FIG. 2 depicts a digital medium environment 200 in an example implementation showing operation of the text style transfer system 104 of FIG. 1 in greater detail.

Figure 3A:
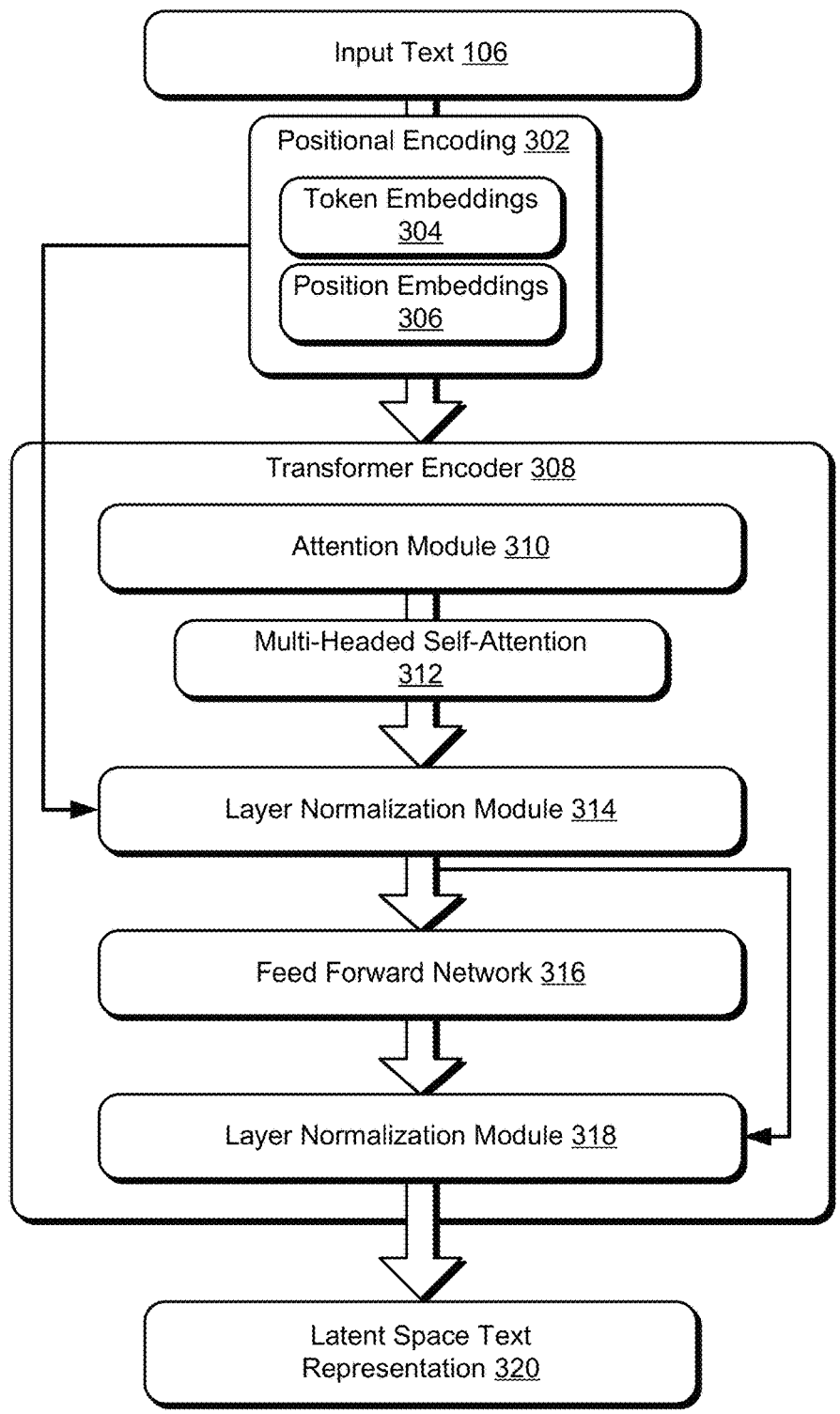
FIGS. 3A and 3B depict a digital medium environment that includes an example architecture for a transformer-based variational autoencoder implemented by the text style transfer system of FIG. 1.
Figure 3B:
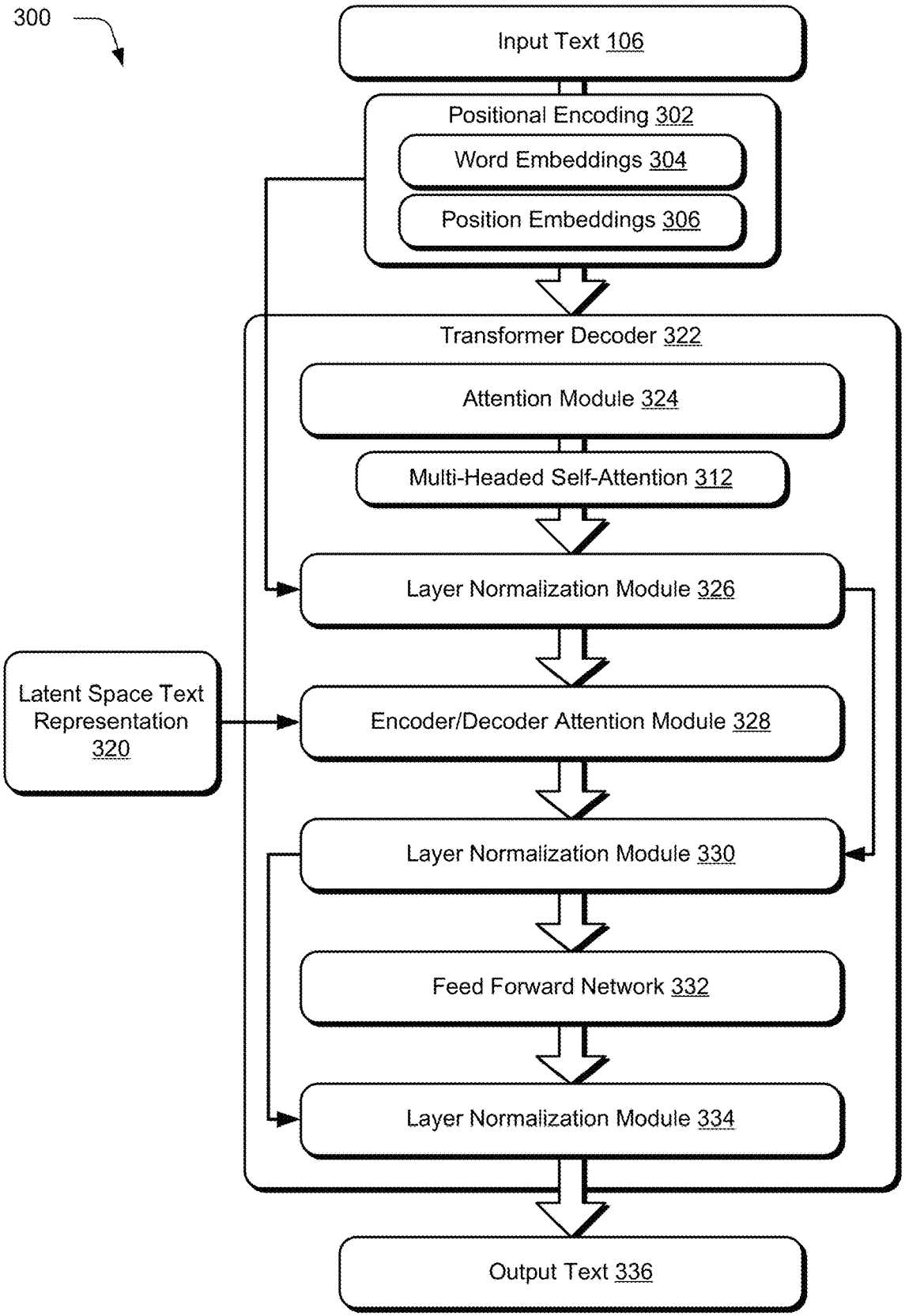

FIGS. 3A and 3B depict a digital medium environment 300 that includes an example transformer architecture for a transformer-based variational autoencoder implemented by the text style transfer system 104 of FIG. 1.

Figure 4:
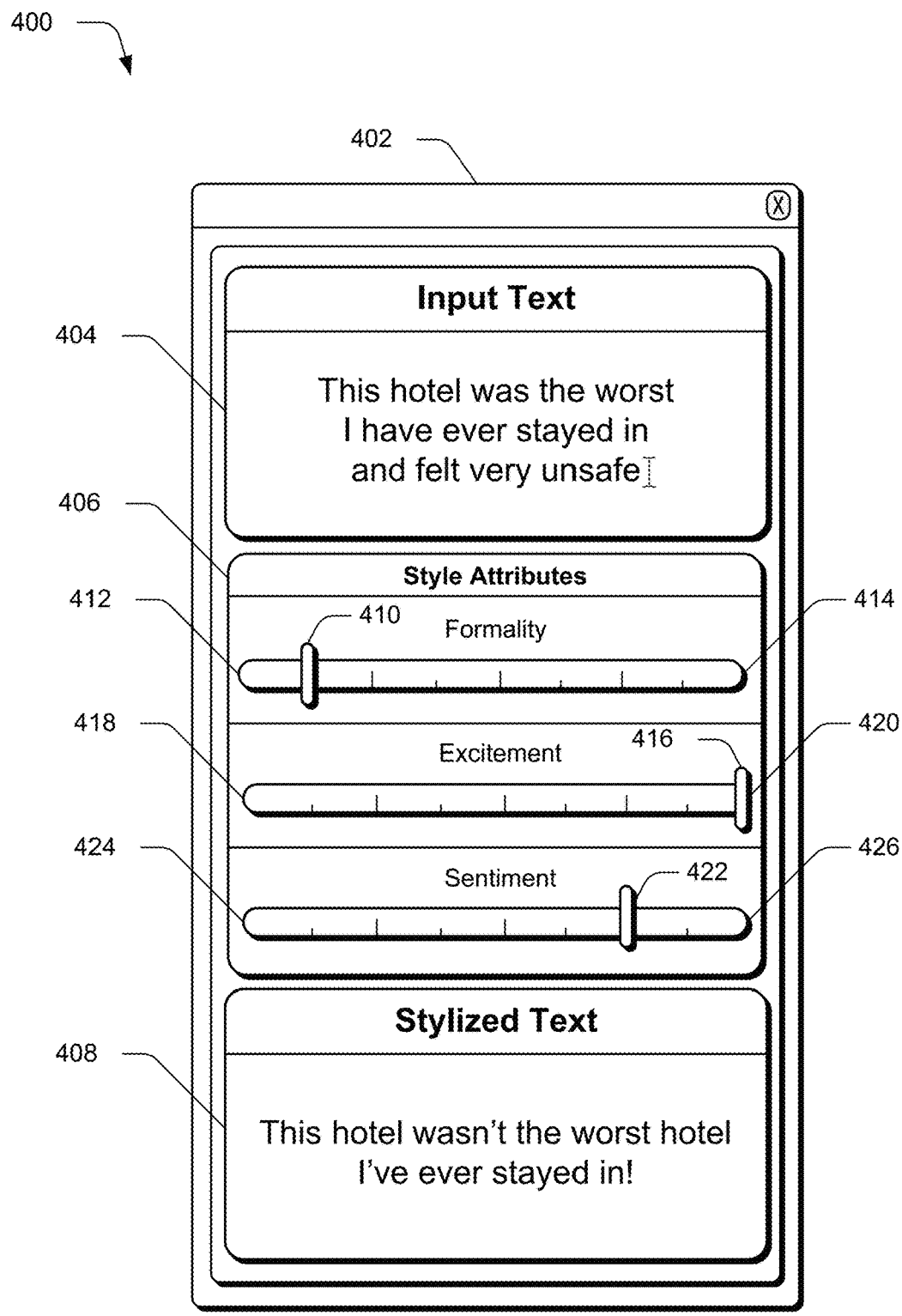
FIG. 4 depicts a digital medium environment that includes an example user interface of the text style transfer system of FIG. 1.

FIG. 4 depicts a digital medium environment 400 in an example implementation that includes a user interface for the text style transfer system 104 of FIG. 1.

As illustrated in FIG. 2, the text style transfer system 104 receives the input text 106. The input text 106 is representative of digital text content that includes at least one sentence. Although the input text 106 is representative of digital text content authored in any language, it is described herein in the context of being written in the English language. The input text 106 is provided to the disentanglement module 118 together with an indication of a target style 202 to be used for rewriting the input text 106. In some implementations, the indication of the target style 202 is received via input at a user interface of the text style transfer system 104, as described in further detail below with respect to FIG. 4.

The target style 202 designates one or more style attributes (e.g., formality, sentiment, tone, excitement level, political inclination, author gender, and so forth) and a direction for each of the one or more attributes (e.g., positive or negative). In this manner, the target style 202 defines an objective for rewriting the input text 106 when generating the stylized text 108 that constrains a latent space distance between stylized versions of the stylized text 108 and the target style 202.

The disentanglement module 118 implements a variational autoencoder 204 configured to represent the input text 106 in a latent space. Specifically, the disentanglement module 118 implements a variational autoencoder 204 trained to output a content representation 206 and a style representation 208 for the input text 106. The content representation 206 is representative of data that encapsulates the semantic meaning of the input text 106 and the style representation 208 is representative of data that encapsulates style attributes of the input text 106 (e.g., formality, sentiment, tone, excitement level, political inclination, author gender, and so forth) and a magnitude (e.g., strength) of each style attribute with respect to a direction (e.g., positive or negative) for the style attribute.

Notably, the variational autoencoder 204 is configured to encode the input text 106 into a latent vector space in which the content representation 206 and the style representation 208 are mapped, independent of a corpus of text that contrasts a style expressed by the input text 106 with a different style, (e.g., the target style 202). Similarly, the variational autoencoder 204 is configured to output the content representation 206 and the style representation 208 independent of an annotation identifying one or more style attributes expressed by the input text 106.

The variational autoencoder 204 is configured to encode the input text 106 into a latent vector space in which the content representation 206 and the style representation 208 are mapped. For instance, representing the input text 106 as $x=(x_1, x_2, \ldots x_n)$ where n represents text elements (e.g., words and punctuation marks) included in the input text 106, the variational autoencoder 204 maps the input text 106 into a latent distribution $H=q_E(h|x)$. To do so, an encoder portion the variational autoencoder 204 reads the input text 106 text element-by-text element (e.g., word-by-word) and performs a linear transformation to obtain a hidden vector representation h. A decoder portion of the variational autoencoder 204 generates a sentence text element-by-text element, which when fully trained is the input text 106 itself.

The text style transfer system 104 is configured to train the variational autoencoder 204 using variational autoencoder loss 210. For instance, suppose at a time step t the decoder portion of the variational autoencoder 204 predicts the word $x_t$ for the input text 106 with probability $p(x_t|h, x_1 \ldots x_{t-1})$. The variational autoencoder loss 210 ($J_{VAE}$) is represented by Equation 1.

$$J_{VAE}(\theta_E, \theta_D) = J_{REC} + \lambda_{kl} \mathbb{KL}_{[q_E(h|x) \| p(h)]} \quad \text{(Eq. 1)}$$

In Equation 1, $\theta_E$ represents the encoder parameters, $\theta_D$ represents the decoder parameters, and $J_{REC}$ represents the reconstruction loss implemented by the variational autoencoder 204, which is dependent on the specific neural blocks used in the variational autoencoder 204, as described in further detail below. $\lambda_{kl}$ represents the hyperparameter balancing the Kullback-Leibler ($\mathbb{KL}$) term that penalizes divergence between the input text 106 and the output text predicted by the decoder portion of the variational autoencoder 204. p(h) is the prior, typically the standard normal $\mathcal{N}(0, 1)$, $q_E(h|x)$ is the posterior in the form of $\mathcal{N}(\mu, \text{diag } \sigma^2)$, where $\mu$ and $\sigma$ are predicted by the encoder portion of the variational autoencoder 204.

In implementations where the variational autoencoder 204 is configured as an RNN-based variational autoencoder, the encoder portion of the variational autoencoder 204 is a bi-directional gated recurrent unit (Bi-GRU). The Bi-GRU encoder learns the hidden representation h by reading the input text 106, modeled as $x=(x_1, x_2, \ldots x_n)$, sequentially. The decoder portion of the RNN-based variational autoencoder then decodes the output of the encoder portion sequentially over time, predicting probabilities of each token output by the encoder, conditioned on previous tokens and the latent representation. The reconstruction loss $J_{REC}$ for such an RNN-based variational autoencoder is a negative-log-likelihood loss represented by Equation 2.

$$J_{REC} = \mathbb{E}_{h \sim q_E(h|x)} \left[ -\sum_{t=1}^{n} \log p(x_t | h, x_1 \ldots, x_{t-1}) \right] \quad \text{(Eq. 2)}$$

Alternatively, in some implementations the variational autoencoder 204 is configured as a transformer-based variational autoencoder. An example architecture of a transformer-based variational autoencoder is illustrated in FIGS. 3A and 3B.

As illustrated in the digital medium environment 300 of FIG. 3A, when configured with a transformer-based architecture, the variational autoencoder 204 derives a positional encoding 302 for the input text 106. The positional encoding 302 includes token embeddings 304 and position embeddings 306. The token embeddings 304 describe a text element included in the input text 106 (e.g., words, numbers, punctuation, etc.) and are each correlated with one of the position embeddings 306 that describes the text element's position in the input text 106.

The positional encoding 302 for the input text 106 is provided to a transformer encoder 308 of the variational autoencoder 204. Specifically, the positional encoding 302 is communicated to an attention module 310 of the transformer encoder 308 in the form of a matrix, where an input sequence of symbol representations (e.g., token embeddings 304) are mapped to a sequence of continuous representations (e.g., position embeddings 306). Upon receipt of the positional encoding 302, the attention module 310 of the transformer encoder 308 applies an attention function to the positional encoding 302.

As described herein, the attention function applied by the attention module 310 represents a mapping of a query and a set of key-value pairs to an output, where the query, keys, values, and output are vectors. The output is computed as a weighted sum of the values, where the weight assigned to each value is computed by a compatibility function of the query with the corresponding key. In accordance with one or more implementations, the attention function applied by the attention module 310 is masked multi-headed self-attention 312, which reduces the computational cost associated with determining relationships between words in the input text 106 having greater distances between their associated positional encodings 302.

The masked multi-headed self-attention applied by attention module 310 enables the transformer encoder 308 to model information from different representation subspaces at different positions. In this manner, the masked multi-headed self-attention 312 may be represented as MultiHead (Q, K, V)=Concat(head$_1$, . . . , head$_h$)W$^O$, where head$_i$=Attention(QW$_i^Q$, KW$_i^K$, VW$_i^V$). In this representation, Q represents the queries, K represents the keys, and V represents the values of the attention function implemented by the attention module 310, where the queries and keys are of dimension $d_k$ and the values are of dimension $d_v$.

Projections output by the attention module 310 in implementing the masked multi-headed self-attention 312 are parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_v}$, and $W^O \in \mathbb{R}^{hd_v \times d_{model}}$. In these parameter matrices, h is an integer representing a number of parallel attention layers, or heads, employed by attention module 310. In accordance with one or more implementations, attention module 310 employs eight parallel attention layers. The output of the attention function applied to the positional encoding 302 by the attention module 310 is then normalized by the layer normalization module 314 before being passed to the feed forward network 316.

The feed forward network 316 is representative of functionality of the transformer encoder 308 to apply linear transformations to received data, with a rectified linear unit (ReLU) activation applied in between the linear transformations. Functionality of the feed forward network 316 is thus represented as: FFN(x)=max(0, xW$_1$+b$_1$) W$_2$+b$_2$. Linear transformations of the feed forward network 316 are applied in a pointwise manner, such that the linear transformations are applied to each position noted in the positional encoding 302 in a separate and identical manner Output values from the feed forward network 316 are again normalized by a layer normalization module 318, which performs functionality similar to that of the layer normalization module 314 to generate a latent space text representation 320 for the input text 106. The latent space text representation 320 is a hidden word representation ($z_1$, $z_2$, . . . , $z_n$) learned by the transformer encoder 308 and pooled into one or more sentences z, which is encoded into the probabilistic latent space $q_E(h|x)$. A sample from this latent space text representation 320 is provided as an input to an encoder/decoder attention module in the decoder portion of the variational autoencoder 204, as illustrated in FIG. 3B.

As depicted in FIG. 3B, the positional encoding 302 for the input text 106 is passed to a transformer decoder 322 of the variational autoencoder 204. The transformer decoder 322 is similar to the transformer encoder 308, with an additional encoder-decoder attention portion. In this manner, the attention module 324 of the transformer decoder 322 performs functionality similar to that of the attention module 310 using masked multi-headed self-attention 312. Layer normalization modules 326, 330, and 334 thus perform functionality similar to that of layer normalization module 314 and feed forward network 332 performs functionality similar to that of feed forward network 316.

Between the two sublayers in the transformer decoder 322 (e.g., the attention module 324 and the layer normalization module 326; and the feed forward network 332 and the layer normalization module 334), the transformer decoder 322 includes a layer including the encoder/decoder attention module 328 and the layer normalization module 330. Queries used by the decoder attention module 328 include outputs from the feed forward network 316 and keys and values are obtained from the latent space text representation 320. Consequently, the transformer decoder 322 is configured to reconstruct the input text 106 with condition on the hidden vector representation h, that is separable into two spaces s and c, where s is the style representation 208 and c is the content representation 206. This reconstruction of the input text 106 is represented as the output text 336 generated by the transformer decoder 322.

In some implementations, a transformer-based variational autoencoder 204 implemented by the disentanglement module 118 is pre-trained, such that the output text 336 is the same as the input text 106. Alternatively, in some implementations the text style transfer system 104 is configured to train a transformer-based instance of the variational autoencoder 204 by iteratively processing the input text 106 to generate output text 336 and adjusting internal weights of the transformer encoder 308 and/or the transformer decoder 322 until the output text 336 matches the input text 106.

Although the digital medium environment 300 is illustrated as including only a single transformer encoder 308 and a single transformer decoder 322, in implementations a transformer-based variational autoencoder 204 is configured to include multiple instances of the transformer encoder 308 layered with one another and multiple instances of the transformer decoder 322 layered with one another. In implementations where the variational autoencoder 204 is configured as a transformer-based variational autoencoder, the reconstruction loss $J_{REC}$ is represented by Equation 3.

$$J_{REC} = \mathbb{E}_{h \sim q_E(h|x)} \left[ -\sum_{i=1}^{|x|} ((1-\epsilon) \sum_{i=1}^{v} \bar{p}_i \log(p_i) + \frac{\epsilon}{v} \sum_{i=1}^{v} \log(p_i)) \right] \quad \text{(Eq. 3)}$$

In Equation 3, v represents the vocabulary size, $\epsilon$ represents the label smoothing parameter, $\bar{p}_i$ represents the ground truth probability, and $p_i$ represents the predicted probability over the vocabular at every time step for word-wise decoding.

The variational autoencoder loss 210, as set forth in Equation 1, enables disentangled representation learning for the variational autoencoder 204 and trains the variational autoencoder 204 to separate the hidden vector representation h into two spaces s and c, where s is the style representation 208 and c is the content representation 206. In this manner, the hidden vector representation h is represented as h=[s; c], where [;] denotes concatenation. However, while the reconstruction loss $J_{REC}$ is the primary loss generation in Equation 1, it does not itself take into consideration the style of the input text 106 or the controlled generation of the content representation 206 or the style representation 208.

To address these considerations, the text style transfer system 104 leverages additional multitask and adversarial losses on the latent space h to disentangle the embeddings generated by the variational autoencoder 204 into the content representation 206 and the style representation 208. To ensure proper disentanglement, the disentanglement module 118 leverages both multitask and adversarial losses for each of the style and content domains of the latent space in which the input text 106 is represented. These multitask and adversarial losses are represented in FIG. 2 as multitask style loss 212, adversarial style loss 214, multitask content loss 216, and adversarial content loss 218.

With respect to style-oriented loss, the multitask style loss 212 ensures that the style space is discriminative for style and the adversarial loss for style ensures that the content space is not discriminative of the style. The multitask style loss 212 is denoted $J_{mul(s)}$ and used to train a style classifier on the style domain of the latent space in which the input text 106 is represented, jointly with the autoencoder loss for the variational autoencoder 204. The multitask style loss 212 is defined as $J_{mul(s)}(\theta_E; \theta_{mul(s)}) = -\Sigma_{l\in labels} t_s(l) \log y_s(l)$, where $\theta_{mul(s)}$ represents parameters for the style classifier, $y_s$ represents the style probability distribution predicted by the style classifier, and $t_s(.)$ is the ground truth style distribution.

The adversarial style loss 214 is denoted $J_{dis(s)}$ and used to train an adversarial classifier that deliberately discriminates a true style label for the input text 106 using the content representation 206 expressed as a vector in the latent space including the content representation 206 and the style representation 208. The adversarial style loss 214 is defined as $J_{dis(s)}(\theta_{dis(s)}) = -\Sigma_{l\in labels} t_s(l) \log y_s'(l)$. In the definition for the adversarial style loss 214, $\theta_{dis(s)}$ represents parameters for style adversary and $y_s'$ is the style probability distribution predicted by the adversarial classifier on the content space. The encoder implemented by the variational autoencoder 204 (e.g., the transformer encoder 308) is trained to learn a content vector space c, from which its adversary cannot predict style information. In this manner, the objective is to maximize the cross entropy $H(p) = \Sigma_{l\in labels} p_i \log(p_i)$, with the adversary $J_{adv(s)}(\theta_E) = H(y_s'|c; \theta_{dis(s)})$.

The multitask content loss 216 is configured to ensure that all content information remains in the content space without seeping into the style space. Content information included in the content space is defined using part-of-speech tags (e.g., nouns) identified in the input text 106 and used to designate content. By defining content in this manner, the disentanglement module 118 allows for a generic content loss for all style dimensions, in contrast to conventional text modeling approaches that define content as a bag-of-words in a sentence, where stop-words and specific style-related lexicon (e.g., sentiment vocabulary) are excluded from being designated as content.

In this manner, the multitask content loss 216 is analogical to the multitask style loss 212 and defined as $J_{mul(c)}(\theta_E; \theta_{mul(c)}) = -\Sigma_{w\in content} t_c(w) \log y_c(w)$. In the definition for the multitask content loss 216, $y_c$ represents the content probability distribution predicted by a content classifier and $t_c(.)$ represents the ground truth content distribution.

The adversarial content loss 218 ensures that the style space does not contain content information. In implementing the adversarial content loss 218, the disentanglement module 118 trains a content adversary classifier on the style space to predict content features in the input text 106. The disentanglement module 118 then trains the encoder of the variational autoencoder 204 (e.g., the transformer encoder 308) to learn a style vector space s, from which the content adversary cannot predict content information. The adversarial content loss 218 is defined as $J_{dis(c)}(\theta_{dis(c)}) = -\Sigma_{w\in content} t_c(w) \log y_c'(w)$, with the adversary being $J_{adv(c)}(\theta_E) = H(y_c'|s; \theta_{dis(s)})$.

By training the variational autoencoder 204 with the variational autoencoder loss 210, the multitask style loss 212, the adversarial style loss 214, the multitask content loss 216, and the adversarial content loss 218, the disentanglement module 118 ensures that the latent space used to represent the input text 106 is disentangled. Collectively, the final loss used by the disentanglement module 118 to train the variational autoencoder 204 is defined as $J_{total} = J_{VAE} + \lambda_{mul(s)} J_{mul(s)} - \lambda_{adv(s)} J_{adv(s)} + \lambda_{mul(c)} J_{mul(c)} - \lambda_{adv(c)} J_{adv(c)}$. By ensuring disentanglement, the disentanglement module 118 generates the content representation 206 without including style attribute information for the input text 106 and generates the style representation 208 without including content information for the input text 106.

Although described and illustrated as generating only a single style representation 208, the disentanglement module 118 is configured to generate a plurality of style representations 208 for the input text 106, such that a different style representation 208 is generated for each of a plurality of style attributes conveyed by the input text 106. In this manner, the disentanglement module 118 is configured to generate a first style representation 208 describing a formality expressed by the input text 106, a second style representation 208 describing an excitement level expressed by the input text 106, and so forth.

The disentanglement module 118 then provides the content representation 206 and the style representation 208 for the input text 106 to the counterfactual reasoning module 120. The counterfactual reasoning module 120 is configured to identify an incremental degree by which the style representation 208 is adjustable to generate different stylized versions of the input text 106, such that each version represents the target style 202 in a different manner. To do so, the counterfactual reasoning module 120 implements a multi-layer perceptron (MLP) classifier 220 trained on the disentangled style latent representations learned by the variational autoencoder 204.

The MLP classifier 220 predicts, for each style representation 208 generated by the disentanglement module 118, a variant of the style representation 208 with respect to the target style 202. The objective of the MLP classifier 220 is to generate variants of the style representation 208 as close as possible to the style representation 208 while still achieving a different representation of the target style 202 (e.g., if the target style 202 is a positive sentiment the MLP classifier 220 attempts to generate a variant of the style representation 208 that is close to the style representation 208 and expresses a slightly less negative sentiment).

To enforce this objective, the counterfactual reasoning module 120 implements counterfactual generation loss, $J_{cfactual}$. The counterfactual generation loss is defined as $J_{cfactual} = L(s'|s) = \lambda(f_t(s') - p_t)^2 + L_1(s', s)$. In the counterfactual loss definition, t represents the desired target style 202, s' represents the variant of the style representation 208 generated by the MLP classifier 220, and $p_t$ represents the probability with which the target style 202 is applied to generate s'. In this manner, $p_t = 1$ is representative of a perfect transfer of the target style 202 to the style representation 208, such that the resulting s' conveys precisely one or more style attributes specified by the target style 202.

In the counterfactual loss definition, $f_t$ is the model prediction on class t and $L_1$ is the distance between s' and the style representation 208, s. The first term in the counterfactual loss guides the MLP classifier 220 towards generating an s' that adapts to the target style 202, and λ represents a weighting term. The MLP classifier 220 uses the $L_1$ distance to ensure that a minimum number of features of the target style 202 are changed when generating s'. The counterfactual reasoning module 120 generates a target style embedding 222 that includes the resulting style representation variants 224. Each variant of the style representation 208 included in the style representation variants 224 is defined by a style transfer strength that represents one of the probabilities $p_t$ used to achieve s'.

The style representation variants 224 included in the target style embedding 222 are obtained by optimizing arg $\min_s \max_\lambda L(s'|s)$, subject to $|f_t(s' - p_t)| \leq \in$, where $\in$ is a tolerance parameter. For instance, in an example implementation where the trained MLP classifier 220 identifies at least three different probabilities $p_t$ that are useable to generate variants of the style representation 208 with respect to the target style 202, each of the probabilities $p_t$ is represented as one of the transfer strengths 226, 228, or 230. Although illustrated in FIG. 2 as including three variations of the style representation 208, represented by transfer strengths 226, 228, and 230, the counterfactual reasoning module 120 is configured to generate any number of style representation variants 224, constrained by the text elements included in the input text 106.

In some implementations, different transfer strengths used to generate the style representation variants 224 (e.g., transfer strengths 226, 228, and 230) are spaced equidistant from one another, such sequential transfer strengths represent proportionally incremental applications of the target style 202 to the style representation 208. Alternatively or additionally, in implementations the style transfer strengths used to generate style representation variants 224 are not uniformly spaced from one another, such that when mapped onto an axis representing a spectrum of style attributes, a distance between a first and second transfer strength is not the same as a distance between a third transfer strength and the second transfer strength, and so forth.

The style representation variants 224 included in the target style embedding 222 are communicated to the stylization module 122 together with the content representation 206. The stylization module 122 is configured to generate stylized versions of the input text 106 that each express a different degree of the target style 202 by combining the style representation variants 224 with the content representation 206. To do so, the stylization module 122 uses an encoder-decoder framework, such as the example transformer-based encoder-decoder framework illustrated in the digital medium environment 300 of FIGS. 3A and 3B to concatenate the content representation 206 with one of the style representation variants 224.

Each one of the style representation variants 224 is thus combinable with the content representation 206 to generate a stylized version of the input text 106 for output as part of the stylized text 108. For instance, in the illustrated example of FIG. 2, the stylization module 122 concatenates the content representation 206 with one of the style representation variants 224 corresponding to transfer strength 226 to generate stylized version 232 of the input text 106. Similarly, the content representation 206 is concatenated with one of the style representation variants 224 corresponding to transfer strength 228 to generate stylized version 234 and with a different one of the style representation variants 224 corresponding to transfer strength 230 to generate stylized version 236.

Although the stylized text 108 is depicted in FIG. 2 as including only three stylized versions of the input text 106 (e.g., stylized versions 232, 234, and 236), the stylization module 122 is configured to generate any number of stylized versions of the input text 106, such as one stylized version for each of the style representation variants 224 included in the target style embedding 222. In some implementations, the stylization module 122 is configured to output (e.g., display) each stylized version of the stylized text 108 via a computing device implementing the text style transfer system 104. For instance, the stylization module 122 is configured to display the stylized versions 110, 112, 114, and 116 depicted in FIG. 1 simultaneously, thereby providing an overview of how different strength applications of the target style 202 affect the input text 106.

In some implementations, the stylization module 122 is configured to provide one or more controls that are configured to receive user input specifying an output strength 238 to be used for applying the target style 202 to the input text 106. Specifying the output strength 238 to be used for applying the target style 202 to the style representation 208 of the input text 106 controls what stylized version of the stylized text 108 is output by the stylization module 122.

FIG. 4 depicts an example of a user interface 402 for the text style transfer system 104. In the illustrated example, the user interface 402 includes an input text region 404 configured to display input text (e.g., the input text 106) to be rewritten by applying attributes of a target style (e.g., the target style 202). In some implementations, the input text region 404 is configured to receive data from an input device of a computing device implementing the text style transfer system 104, (e.g., a keyboard, a microphone, a touchscreen, and so forth) defining the input text 106.

The user interface 402 further includes a style attributes region 406 configured with controls that enable designation of the output strength 238 to be used in generating stylized text 108. Input to one or more controls included in the style attributes region 406 affects a stylized version of the input text 106 presented in a stylized text region 408 of the user interface 402, such as one or more of the stylized versions 232, 234, or 236.

In the illustrated example of FIG. 4, the style attributes region 406 includes controls for adjusting three example style attributes for rewriting input text displayed in the input text region 404 as stylized text output in the stylized text region 408. Specifically, the style attributes region 406 includes example controls for specifying a formality, an excitement, and a sentiment to be expressed by stylized text 108. In the style attributes region 406, controls for specifying style attributes are configured as slider controls, where a position of a slider relative to ends of a control bar specify a magnitude of the style attribute relative to a direction for the style attribute.

For instance, the illustrated example depicts a formality control, where a slider 410 is positioned relative to a first end 412 of a formality control bar and a second end 414 of the formality control bar. The first end 412 of the control bar indicates a negative direction of the formality style attribute (e.g., informal text) and the second end 414 of the control bar indicates a positive direction of the formality style attribute (e.g., formal text). In this manner, adjusting a position of the slider 410 towards the second end 414 increases a degree of formality expressed by the stylized version of the input text displayed in the stylized text region 408. Conversely, adjusting a position of the 410 towards the first end 412 increases a degree of informality expressed by the stylized version of text displayed in the stylized text region 408.

The excitement control is similarly configured with a slider 416 positioned relative to a first end 418 and a second end 420 of a control bar. The first end 418 indicates a negative direction of the excitement style attribute (e.g., text expressing a lack of excitement or indifference) and the second end 420 indicates a positive direction for the excitement style attribute (e.g., text emoting excitement or enthusiasm). Adjusting a position of the slider 416 towards the first end 418 thus decreases a level of excitement conveyed by the stylized text output in the stylized text region 408, while adjusting a position of the slider 416 towards the second end 420 increases the level of excitement conveyed by the stylized text.

The sentiment control is configured with a slider 422 positioned relative to a first end 424 and a second end 426 of a control bar. The first end 424 indicates a negative direction of the sentiment style attribute (e.g., a negative sentiment expressed by text) and the second end 426 indicates a positive direction for the sentiment attribute (e.g., a positive sentiment expressed by text). Adjusting a position of the slider 422 towards the first end 424 thus causes output of a stylized version of input text expressing an increasingly negative sentiment, while adjusting a position of the slider 422 towards the second end 426 causes output of a stylized version of input text expressing an increasingly positive sentiment.

The formality, excitement, and sentiment controls depicted in the illustrated example of FIG. 4 are merely representative of example controls supported by the text style transfer system 104 that enable specification of the output strength 238 to use in generating stylized text 108. Although depicted as including three style attribute slider controls, the user interface 402 is configurable to include any number and format of style attribute controls. For instance, in implementations style attribute controls presented in the style attributes region 406 are configured as scroll wheels, buttons (e.g., up/down arrows), numeric entry fields, combinations thereof, and so forth.

The style attribute controls included in the style attributes region 406 thus enable a user of the text style transfer system 104 to specify, for one or more style attributes, a magnitude relative to a direction of the style attribute to use in selecting one or more of the style representation variants 224 for output in the user interface 402. By deriving different transfer strengths for individual style attributes using counterfactual generation loss, style attribute controls provided by the text style transfer system 104 enable fine-tune adjustment of various style attributes when generating stylized text.

In some implementations, the style attributes region 406 is configured to provide an indication (e.g., a visual display, an audible report, combinations thereof, and so forth) of the specific style attribute transfer strength selected via each of the style attribute controls. For instance, in an example implementation the tick marks on the formality control bar depicted in FIG. 4 each correspond to one of the transfer strengths 226, 228, and 230 derived by the counterfactual reasoning module 120 for a formality target style 202. Input positioning the slider 410 relative to one of the tick marks causes the style attributes region 406 to provide an indication of the corresponding transfer strength selected for the formality attribute (e.g., transfer strength 228) used to generate the stylized text output in stylized text region 408. In this manner, the user interface 402 provides a clear indication to a user of the text style transfer system 104 regarding the specific strength at which a target style 202 is applied to input text 106 and how moderating influence of a particular style attribute impacts the resulting stylized text 108.

Although the stylized text region 408 in FIG. 4 depicts only a single instance of a stylized version of input text 106, the stylized text region 408 is configurable to display a plurality of stylized versions, such as a simultaneous display of the stylized versions 232, 234, and 236. In implementations where the stylized text region 408 outputs a simultaneous display of multiple stylized versions of input text, the user interface 402 is configured to visually distinguish one of the stylized versions from other stylized versions based on the style attributes region 406. For instance, the text style transfer system 104 is configured to visually emphasize (e.g., highlight, bold, italicize, border, etc.) one of a plurality of stylized versions output in the stylized text region 408 that would be generated using a current designation of style attributes to be applied to input text as specified by controls in the style attributes region 406.

Using the stylized text 108 depicted in FIG. 1 as an example, input to controls presented in style attributes region 406 causes the text style transfer system 104 to visually distinguish one of the stylized versions 110, 112, 114, or 116 from other ones of the stylized versions that would not result from a current style attribute control configuration. The current position of the slider 416 as depicted in FIG. 4, for instance, might cause the text style transfer system 104 to highlight or otherwise visually distinguish the stylized version 116 from the stylized versions 110, 112, and 114. Continuing this example, input at the excitement style attribute in style attributes region 406 moving the slider 416 towards the first end 418 of the excitement control bar causes the text style transfer system 104 to highlight or otherwise emphasize different ones of the stylized versions 110, 112, and 114 (e.g., iteratively highlighting stylized version 114, then stylized version 112, until ultimately highlighting stylized version 110 upon positioning of the slider 416 and the first end 418).

In this manner, the user interface 402 provides a clear indication of how applying style attributes at varying strengths to input text depicted in the input text region 404 affects a resulting stylized version of text output in the stylized text region 408. Advantageously, the techniques described herein provide fine-tuned control of applying one or more style attributes to input text, generate a plurality of versions of stylized text for each strength application of the one or more style attributes, and clearly demonstrate how moderating influence of a particular style attribute impacts the resulting stylized text, which is not enabled by conventional text styling approaches.

Having considered example systems and techniques, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4.

Figure 5:
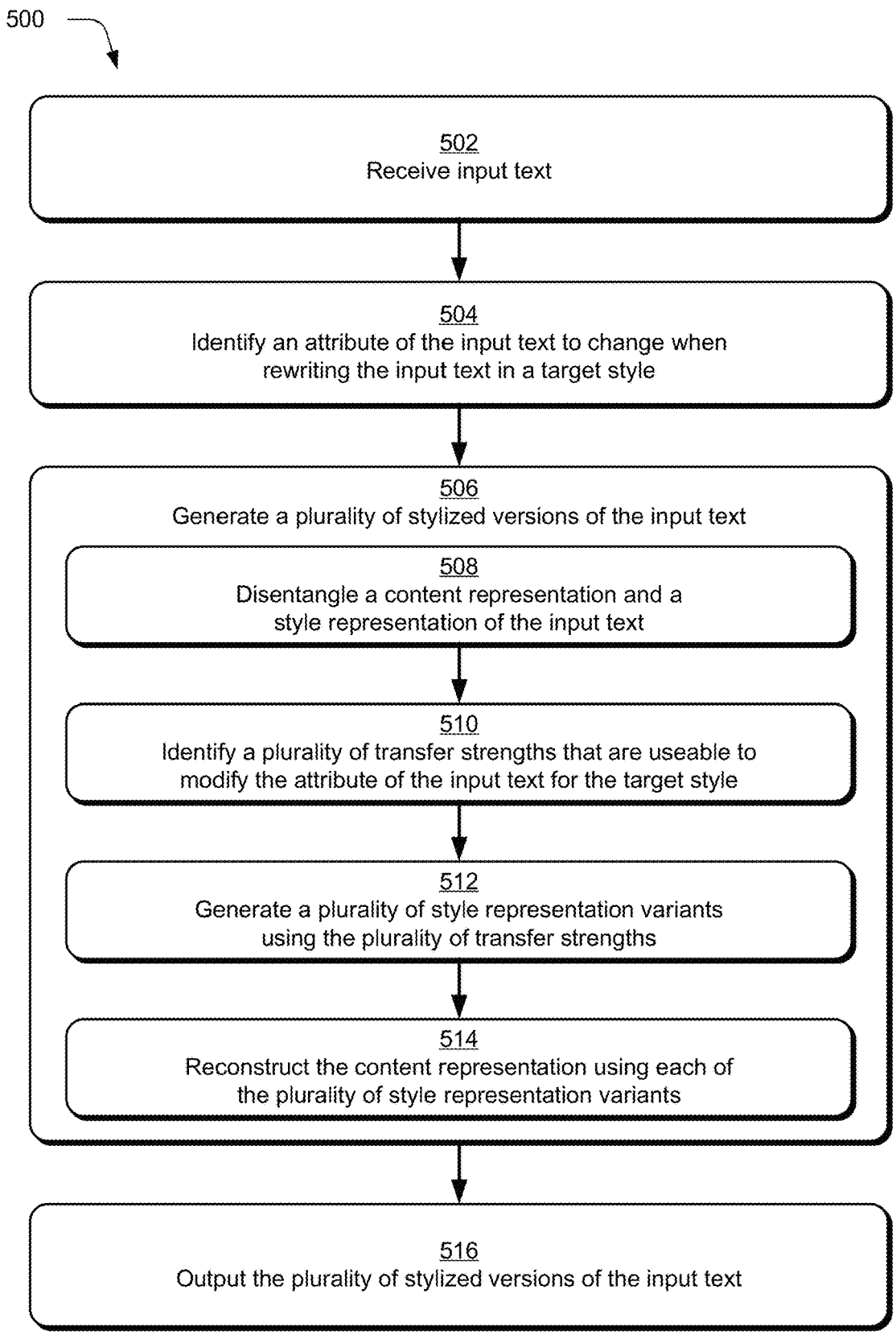
FIG. 5 is a flow diagram depicting a procedure in an example implementation of generating stylized versions of input text using the techniques described herein.

FIG. 5 is a flow diagram depicting a procedure 500 in an example implementation of generating stylized versions of input text using the techniques described herein. To begin, input text is received (block 502). The text style transfer system 104 for instance, receives input text 106. In some implementations, the input text 106 is received via an input device (e.g., keyboard, microphone, etc.) of a computing device implementing the text style transfer system 104. For instance, in some implementations the input text 106 is received via input to an input text region 404 of a user interface 402 for the text style transfer system 104.

An attribute of the input text to change when rewriting the input text in a target style is identified (block 504). The disentanglement module 118, for instance, receives an indication of a target style 202 to use for generating stylized text 108 that includes a plurality of stylized versions of the input text 106, each generated by applying a different strength of the target style 202 to the input text 106. In some implementations, the target style 202 is specified via input to one or more controls presented in a user interface 402 for the text style transfer system 104, such as the example style attribute controls depicted in the style attributes region 406 of FIG. 4.

The plurality of stylized versions of the input text are then generated (block 506). As part of generating the plurality of stylized versions of the input text 106 (e.g., the stylized versions 110, 112, 114, and 116), a content representation and a style representation of the input text are disentangled (block 508). To do so, the disentanglement module 118 implements a variational autoencoder 204 using variational autoencoder loss 210, multitask style loss 212, adversarial style loss 214, multitask content loss 216, and adversarial content loss 218 to generate the content representation 206 and the style representation 208 for the input text 106. Using this combination of losses, the disentanglement module 118 ensures that style information for the input text 106 is not expressed in the content representation 206 and that content information for the input text 106 is not expressed in the style representation 208.

In some implementations, the style representation 208 is generated based the target style 202 specified for use in generating the stylized text 108. For instance, in an example implementation where the target style 202 indicates that the input text 106 is to be rewritten as stylized text 108 using varying degrees of formality, the style representation 208 includes information describing a formality expressed by the input text 106. In such implementations, the disentanglement module 118 leverages a variational autoencoder 204 pre-trained to derive style representations for the target style 202. Alternatively or additionally, the disentanglement module 118 is configured to train the variational autoencoder 204 to output style representations for the target style 202 using the techniques described herein.

A plurality of transfer strengths that are useable to modify the attribute of the input text for the target style are then identified (block 510). The counterfactual reasoning module 120, for instance, implements a trained MLP classifier 220 using counterfactual generation loss to identify different probability values that are useable to achieve different text variants for the target style 202 having varied degrees of transferring the target style 202 to the input text 106. These plurality values are expressed as transfer strengths for the target style 202, such as the example transfer strengths 226, 228, and 230 illustrated in FIG. 2.

A plurality of style representation variants are generated using the plurality of transfer strengths (block 512). The counterfactual reasoning module 120, for instance, generates a target style embedding 222 that includes a plurality of style representation variants 224, one for each of the plurality of transfer strengths derived by the trained MLP classifier 220 (e.g., one style representation variant for each of the transfer strengths 226, 228, and 230). Each of the style representation variants 224 is thus representative of an instance of the style representation 208 generated via application of a different degree of the target style 202.

To generate the plurality of stylized versions of the input text, the content representation is reconstructed using the plurality of style representation variants (block 514). The stylization module 122, for instance, receives the content representation 206 and the style representation variants 224 included in the target style embedding 222. The stylization module 122 then concatenates one of the style representation variants 224 with the content representation 206 to generate a stylized version of the input text 106. The stylization module 122 repeats this process of concatenating one of the style representation variants 224 with the content representation 206 for each style representation variant represented by one of the transfer strengths in the target style embedding 222, thereby generating a plurality of stylized versions of the input text 106 (e.g., stylized versions 232, 234, and 236).

The plurality of stylized versions of the input text are then output (block 516). The stylization module 122, for instance, outputs the plurality of stylized versions of the input text input text 106 included in the stylized text 108 for display via a computing device implementing the text style transfer system 104. In some implementations, the stylized text 108 is displayed via a user interface for the text style transfer system 104, such as via the stylized text region 408 of the example user interface 402 depicted in FIG. 4.

Having described example procedures in accordance with one or more implementations, consider now an example system and device to implement the various techniques described herein.

Example System and Device

Figure 6:
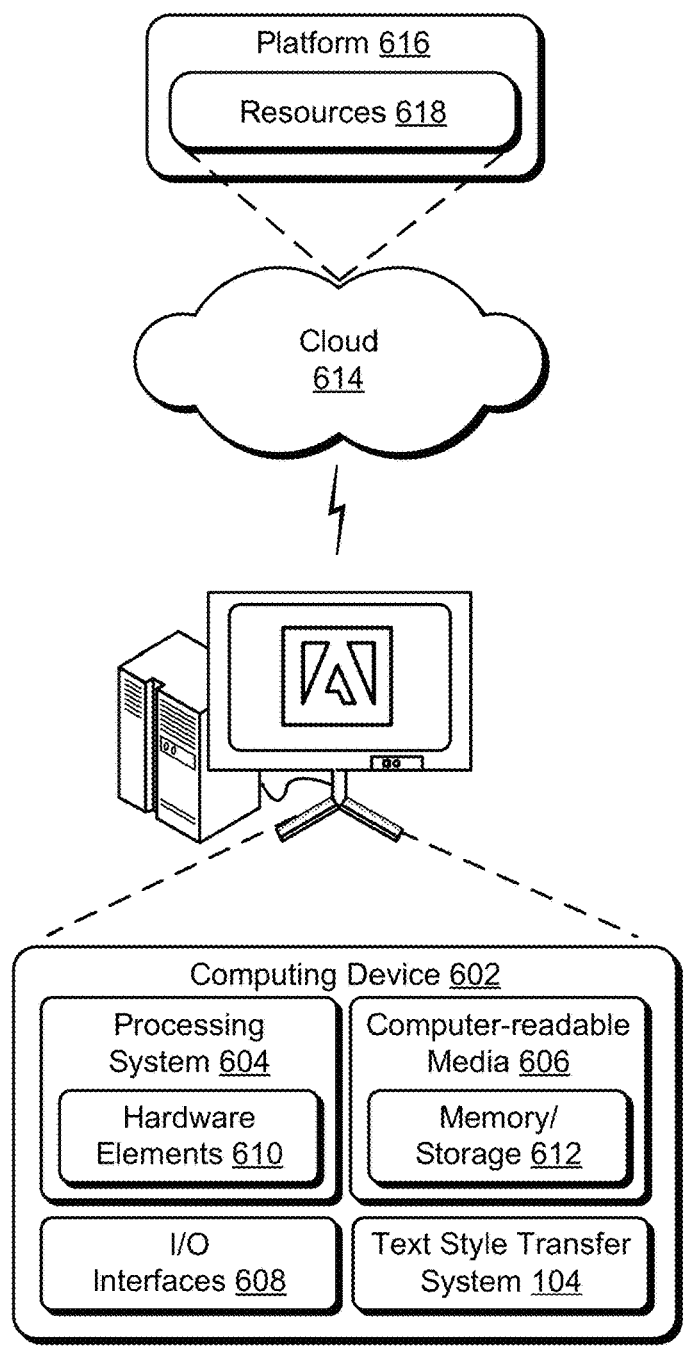
FIG. 6 illustrates an example system including various components of an example device to implement the techniques described with reference to FIGS. 1-5.

FIG. 6 illustrates an example system 600 that includes an example computing device 602, which is representative of one or more computing systems and/or devices that implement the various techniques described herein. This is illustrated through inclusion of the text style transfer system 104. The computing device 602 is configured, for example, as a service provider server, as a device associated with a client (e.g., a client device), as an on-chip system, and/or as any other suitable computing device or computing system.

The example computing device 602 as illustrated includes a processing system 604, one or more computer-readable media 606, and one or more I/O interface 608 that are communicatively coupled, one to another. Although not shown, the computing device 602 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that are configurable as processors, functional blocks, and so forth. For instance, hardware element 610 is implemented in hardware as an application specific integrated circuit or other logic device formed using one or more semiconductors. The hardware elements 610 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 606 is illustrated as including memory/storage 612. The memory/storage 612 represents memory/storage capacity associated with one or more computer-readable media. The memory/storage 612 is representative of volatile media (such as random-access memory (RAM)) and/or nonvolatile media (such as read only memory (ROM), Flash memory, optical disks, magnetic disks, and so forth). The memory/storage 612 is configured to include fixed media (e.g., RAM, ROM, a fixed hard drive, and so on) as well as removable media (e.g., Flash memory, a removable hard drive, an optical disc, and so forth). In certain implementations, the computer-readable media 606 is configured in a variety of other ways as further described below.

Input/output interface(s) 608 are representative of functionality to allow a user to enter commands and information to computing device 602 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 602, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 610. The computing device 602 is configured to implement instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supported by various configurations of the computing device 602 and are not limited to the specific examples of the techniques described herein. This functionality is further configured to be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 include applications and/or data that is utilized while computer processing is executed on servers that are remote from the computing device 602. Resources 618 also include services provided over the Internet and/or through a subscriber network, such as a cellular or Wi-Fi network.

The platform 616 is configured to abstract resources and functions to connect the computing device 602 with other computing devices. The platform 616 is further configured to abstract scaling of resources to provide a corresponding level of scale to encountered demand for the resources 618 that are implemented via the platform 616. Accordingly, in an interconnected device embodiment, implementation of functionality described herein is configured for distribution throughout the system 600. For example, in some configurations the functionality is implemented in part on the computing device 602 as well as via the platform 616 that abstracts the functionality of the cloud 614.

CONCLUSION

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:
   receiving, by a processing device, input text and an indication of a target style in which the input text is to be rewritten;
   generating, by the processing device, a content representation specifying semantic information conveyed by the input text and a style representation specifying one or more style attributes expressed by the input text by encoding text elements of the input text into a latent vector space that indicates the content representation and the style representation;
   generating, by the processing device using a neural network, a plurality of stylized versions of the input text, each of the plurality of stylized versions of the input text including different positions of punctuation relative to the text elements of the input text, and being generated by:
   identifying a plurality of strengths for applying the target style to the style representation of the input text by processing the style representation for the input text using a multi-layer perceptron classifier configured to generate versions of the style representation that minimize differences from the style representation and express a different magnitude of the target style; and
   applying each of the plurality of strengths of the target style to the style representation for the input text; and
   outputting, by the processing device, a display of the plurality of stylized versions of the input text.

2. The method of claim 1, wherein generating the plurality of stylized versions of the input text is performed independent of a parallel corpus of text that contrasts a style of the input text with the target style.

3. The method of claim 1, wherein the target style defines at least one of a sentiment, a formality, or an excitement level to be conveyed by rewriting the input text in a different style.

4. The method of claim 1, wherein generating the plurality of stylized versions of the input text is performed independent of an annotation identifying a style of the input text.

5. The method of claim 1, further comprising generating a user interface control configured to receive input designating a strength for applying the target style to the input text and visually distinguishing one of the plurality of stylized versions of the input text that corresponds to the designated strength.

6. The method of claim 1, wherein generating the content representation and the style representation is performed using a variational autoencoder.

7. The method of claim 6, wherein the variational autoencoder is configured using a transformer-based architecture.

8. The method of claim 1, wherein generating the content representation is performed using a first multitask loss and a first adversarial loss and generating the style representation is performed using a second multitask loss and a second adversarial loss.

9. The method of claim 1, wherein generating the plurality of stylized versions of the input text comprises maintaining the content representation, generating a plurality of style representation variants by applying different strengths of the target style to the style representation; and concatenating the content representation with individual ones of the plurality of the style representation variants.

10. The method of claim 1, further comprising determining, by a counterfactual reasoning module, a plurality of probability values that correspond to a minimum change to the input text that results in output text expressing a different magnitude of the target style using a counterfactual generation loss, wherein the each of the plurality of the strengths used to generate the plurality of stylized versions of the input text are defined by one of the plurality of probability values.

11. A system comprising:
   a memory component; and
   a processing device coupled to the memory component, the processing device to perform operations comprising:
   disentangling a style representation and a content representation for input text by encoding text elements of the input text into a latent vector space that indicates the content representation and the style representation, the content representation specifying a semantic meaning of the input text and the style representation specifying one or more style attributes expressed by the input text;
   generating a plurality of variants of the style representation for the input text by:
   identifying a plurality of strengths for applying a target style to the style representation of the input text by processing the style representation for the input text using a multi-layer perceptron classifier configured with an objective to generate versions of the style representation that minimize differences from the style representation and express a different magnitude of the target style; and outputting the plurality of variants of the style representation in a target style embedding by applying each of the plurality of strengths of the target style to the style representation for the input text;

generating stylized text that includes a plurality of stylized versions of the input text, each of the plurality of stylized versions of the input text including different positions of punctuation relative to the text elements of the input text, and being generated by concatenating one of the plurality of variants of the style representation with the content representation; and outputting a display of the plurality of stylized versions of the input text.

12. The system of claim 11, further comprising training the multi-layer perceptron classifier to identify the plurality of strengths on disentangled style representations for the target style using counterfactual generation loss.

13. The system of claim 11, further comprising outputting a user interface control configured to receive input designating a strength for applying the target style to the input text and visually distinguishing one of the plurality of stylized versions of the input text that corresponds to the designated strength.

14. The system of claim 11, wherein generating the content representation and the style representation is performed using a variational autoencoder.

15. The system of claim 14, wherein the variational autoencoder is configured using a transformer-based architecture.

16. The system of claim 11, wherein generating the content representation is performed using a first multitask loss and a first adversarial loss and generating the style representation is performed using a second multitask loss and a second adversarial loss.

17. The system of claim 11, wherein disentangling the style representation from the input text is performed independent of a parallel corpus of text that contrasts a style of the input text with the target style.

18. The system of claim 11, wherein the target style defines at least one of a gender tone or a political inclination to be expressed by the plurality of stylized versions of the input text.

19. A non-transitory computer-readable storage medium storing executable instructions, which when executed by a processing device, cause the processing device to perform operations comprising:

receiving input text;

displaying a user interface that includes at least one control configured to define one or more style attributes for a target style in which the input text is to be rewritten;

generating a content representation specifying semantic information conveyed by the input text and a style representation specifying one or more style attributes expressed by the input text by encoding text elements of the input text into a latent vector space that indicates the content representation and the style representation;

generating, using a neural network, a plurality of stylized versions of the input text, each of the plurality of stylized versions of the input text including different positions of punctuation relative to the text elements of the input text, and being generated by:

identifying a plurality of strengths for applying the target style to the style representation of the input text by processing the style representation for the input text using a multi-layer perceptron classifier configured to generate versions of the style representation that minimize differences from the style representation and express a different magnitude of the target style; and applying each of the plurality of strengths of the target style to the style representation for the input text;

displaying the plurality of stylized versions of the input text in the user interface, each of the plurality of stylized versions of the input text being generated by applying a different strength of the target style to the input text;

receiving input at the at least one control modifying at least one of the one or more style attributes; and modifying a display of the user interface to visually distinguish one of the plurality of stylized versions of the input text from others of the plurality of stylized versions of the input text, the visually distinguished one of the plurality of stylized versions of the input text being defined by the one or more style attributes resulting from the input at the at least one control.

20. The non-transitory computer-readable storage medium of claim 19, wherein the generating the plurality of the stylized versions of the input text include concatenating the content representation with individual style representation variants formed by the applying the different strength of the target style to the style representation of the input text.

* * * * *